United States Patent Office 3,160,621
Patented Dec. 8, 1964

3,160,621
EMULSIFIABLE WAXES FROM POLYETHYLENE
Hugh J. Hagemeyer, Jr., Longview, Tex., Joseph L. Greene, Jr., Emory University, Ga., and Charles W. Hequembourg, Kingsport, Tenn., assignors to Eastman Kodak Company, Rochester, N.Y., a corporation of New Jersey
No Drawing. Filed Feb. 8, 1955, Ser. No. 486,974
6 Claims. (Cl. 260—94.9)

This invention concerns wax compositions, more particularly wax compositions obtained from the oxidation of thermally degraded polyethylene.

Polyethylene is prepared by the polymerization of ethylene under pressure in the presence of oxygen and/or catalysts to form polymerization products having high molecular weights. However, polymerization of ethylene to low molecular weight compositions results in the formation of waxes or wax-like materials, but these waxes do not have sufficient hardness to be substituted for carnauba wax in commercial applications. Attempts to oxidize the low molecular weight polyethylenes produced by polymerization result in the formation of cross-linked products which are insoluble in the common organic solvents and have viscosities too high to be used in emulsions. Attempts to find a substitute for carnauba wax have been made by simply degrading high molecular weight polyethylene in an inert atmosphere using heat. This thermal degradation of polyethylene results in wax-like materials, some of which have a relatively high softening point.

Canadian Patent 476,476 and British Patent 581,279 describe the oxidation of high molecular weight ethylene polymers. These patents state that intimate contact of polymers of ethylene alone with air at temperatures of 160–200° C. yields cross-linked products having properties similar to those of the original polymer except that the softening temperature has been raised and the polymer is no longer soluble in the common organic solvents. It is further pointed out in these patents that when air is being used as the oxidizing agent the temperature must exceed 140° and should generally be 160–200° C. However, a cross-linked polymer and a polymer whose viscosity has been substantially increased by any degree of cross-linking cannot be used in preparing emulsions.

Carnauba wax has been high priced for many years on account of its relatively high melting point, its low viscosity, its freedom from tack, its ability to take a high polish and its thixotropic properties which make it particularly useful as an ingredient for various polishing compounds. However, carnauba wax occurs naturally in tropical regions which are accessible with difficulty and is, therefore, available in limited quantities and at relatively high cost. Accordingly, a substitute for this wax has been desired which would be commercially available, inexpensive and consistent in quality.

An object of this invention is to produce a synthetic wax comparable to, and in some respects superior to carnauba wax. Another object is to produce homogeneous wax-like compositions containing oxidized thermally degraded polyethylene which are characterized by the property of forming tough, flexible, non-tacky and highly water resistant coatings. Still another object is to produce an oxidized thermally degraded polyethylene composition which is 100% emulsifiable and self-polishing.

We have discovered that the autoxidation of a thermally degraded polyethylene resin having a molecular weight in the range of 1000–6000 results in the formation of a 100% emulsifiable, self-polishing wax. Some of the advantages of employing the thermal degradation product of a high molecular weight polyethylene resin are: (1) There is no appreciable increase in viscosity during the oxidation treatment; (2) no cross-linking occurs; (3) no rise in the melting point of the wax is experienced; and (4) the oxidized wax has extreme hardness.

Chain branching in resin grade polyethylene having a molecular weight of from 10,000–30,000 normally occurs every 50–70 carbon atoms. Thermal degradation is initiated by heat, light or oxygen residues in the resin and takes place at these points of chain-branching. The degree of degradation is controlled by reaction time and temperature to give hard, white waxes having molecular weights from 2500–4500 and softening points of 90° C. to 110° C. By carefully controlling the time, temperature and agitation, a thermally degraded polyethylene of relatively narrow molecular weight range is obtained. These hard, white wax-like thermal degradation products are not emulsifiable as such, but upon subjecting them in a molten state to a stream of finely divided air or other oxygen containing gas, autoxidation occurs, thereby increasing the acid number and saponification number of the waxes until they are completely emulsifiable and self-polishing. This autoxidation may be initiated in the presence or absence of a catalyst such as ditertiary butyl peroxide or other organic peroxides or hydroperoxides and in the presence or absence of a stabilizing agent such as sodium or potassium carbonate. The use of a peroxygen compound to initiate the oxidation eleminates the induction period usually experienced in this type of oxidation but has no effect on the final acid number or wax properties obtained. The presence of the stabilizing agent gives a faster reaction and a smoother reaction by stabilizing the oxidation intermediate and results in a product which is slightly harder than one obtained in its absence.

Temperature is a particularly important factor in controlling the oxidation and properties of the oxidized wax obtained by our process. Although temperatures varying from 100–250° C. may be employed in oxidizing polyethylene and thermally degraded polyethylene with air and/or oxygen containing gas, the temperature range in which a non cross-linked, oxidized wax of relatively low viscosity and high hardness can be obtained is in the narrow range of 110–150° C. At temperatures below this range the oxidation proceeds only slowly or not at all and at higher temperatures cross-linking and increased viscosities are observed.

According to our invention, valuable, emulsifiable self-polishing hard waxes having a softening point below 110° C. are formed by thermally degrading polyethylene to a molecular weight of from 1000–6000 preferably from 2500–4500 and then oxidizing at a temperature from 100° C. to 250° C. and preferably at 120–140° C. The acid numbers of the waxes obtained by this process vary from 4–25 and optimum properties are usually obtained at an acid number in the range of 8–15. The autoxidation can be initiated by organic peroxides or hydroperoxides such as tertiary butyl peroxide, tertiary butyl hydroperoxide, benzoyl peroxide or cumene hydroperoxide. The stabilizer may be omitted but it is preferred to use a stabilizer such as an alkali hydroxide or carbonate. This usually results in a product of better color and hardness.

The following examples illustrate our invention but are not intended to limit its scope.

*Example 1*

A 4-l. resin jar was equipped as follows: The center neck was fitted with a stainless steel shaft terminating in a sweep type stirrer blade. A propeller type blade was attached 2–3″ above the lower sweep blade. One small neck was fitted with a gas inlet tube fitted with a coarse dispersion disc which was led to a point just below the sweep blade of the stirrer; a second small neck was fitted with a thermometer which reaches to a point just above the sweep type blade and just clearing the propeller type blade; this neck also contained a vent tube. The third small neck was fitted with a second gas inlet tube which may be used to introduce nitrogen into the free space of the vessel in the event that pure oxygen is used as an oxidant, or it may serve as a second inlet tube for air in the event that purified air is the oxidant. In the latter event, it of course is fitted with a dispersion disc and also led to a point below the sweep blade of the stirrer.

A sample (1000 g.) of melted, thermally degraded polyethylene (molecular weight 3200) was introduced into the vessel and the stirrer was started. Di-tert-butylperoxide (5.0 g.) and anhydrous sodium carbonate (10.0 g.) were added to the system and purified air was passed through the dispersion discs at the rate of 3000 ml./min. The temperature of the system was held at 130 plus or minus 2° C. by means of an external heating jacket. After one hour, a second portion (5.0 g.) of di-tert-butylperoxide was added, and the reaction was allowed to continue for an additional 9–11 hours or until an acid number of 8–12 was reached. At the completion of the reaction the molten wax was poured into a suitable mold to harden. However, if small particles are desired the molten wax may be poured in a slow fine stream into rapidly agitated methanol, filtered off, and dried. The wax thus produced formed a 100% self-polishing clear emulsion.

| Properties | Starting Material | Product |
|---|---|---|
| Molecular Weight | 3,200 | 3,500 |
| Softening Point, °C | 101 | 103 |
| Hardness | [1] 0–4 | 0–3 |
| Acid Number | 0.0 | 9.0 |
| Density | 0.919 | 0.920 |
| Emulsifiability, percent | None | 100 |

[1] First number is on 100 g. penetration scale, second on 200 g. scale.

Example 2

Autoxidation was carried out just as described in Example 1 and in the same apparatus described.

| Properties | Starting Material | Product |
|---|---|---|
| Molecular Weight | 3,500 | 3,700 |
| Softening Point, °C | 102 | 104 |
| Hardness | 0.5–5.5 | 0.0–4.0 |
| Acid Number | 0.0 | 15.5 |
| Emulsifiability, percent | None | [1] 100 |

[1] Self-polishing and clear.

Example 3

In the apparatus described in Example 1, 1000 g. of thermally degraded polyethylene was oxidized at 135° C. by passing purified air through the dispersion disc at the rate of 2500 ml. per minute for six hours. The molten wax was then precipitated in a rapidly agitated methanol bath, filtered out and dried.

| Properties | Starting Material | Product |
|---|---|---|
| Molecular Weight | 3,700 | 3,800 |
| Softening Point, °C | 101 | 104 |
| Hardness | 0.5–5.5 | 0.0–3.5 |
| Acid Number | 0.0 | 7.5 |
| Emulsifiability, percent | None | [1] 100 |

[1] Clear, self-polishing.

Example 4

A sample (1000 g.) of molten, thermally degraded polyethylene (molecular weight 3200) was autoxidized in the same apparatus as described in Example 1 except that the initiator, ditertiary butylperoxide, and the stabilizer, anhydrous sodium carbonate were omitted and the product was vacuum stripped of about 0.5% by weight of low boilers. The molten wax was poured into suitable molds.

| Properties | Starting Material | Product |
|---|---|---|
| Molecular Weight | 3,200 | 3,500 |
| Softening Point, °C | 101 | 105 |
| Hardness | 0.5–5.5 | 0.0–3.5 |
| Acid Number | 0.0 | 8.5 |
| Emulsifiability, percent | None | [1] 100 |

[1] Clear, self-polishing.

Example 5

Autoxidation was carried out just as described in Example 4 except that 0.1% sodium carbonate was added as a stabilizer.

| Properties | Starting Material | Product |
|---|---|---|
| Molecular Weight | 3,400 | 3,575 |
| Softening Point, °C | 100 | 103 |
| Hardness | 0.5–5.5 | 0.0–3.5 |
| Acid Number | 0.0 | 15.0 |
| Emulsifiability, percent | None | [1] 100 |

[1] Clear, self-polishing.

Example 6

Autoxidation was carried out in the same apparatus as described in Example 1 and in a like manner except that the catalyst, ditertiary butylperoxide, was omitted. The oxidation was carried out at 135–138° C. for seven hours.

| Properties | Starting Material | Product |
|---|---|---|
| Molecular Weight | 4,100 | 4,300 |
| Softening Point, °C | 103 | 98.99 |
| Hardness | 0.5–4.5 | 0.0–3.0 |
| Acid Number | 0.0 | 9–11 |
| Emulsifiability, percent | None | [1] 100 |

[1] Self-polishing.

Example 7

Autoxidation was carried out in the same apparatus as described in Example 1 and in a like manner using an oxidation temperature of 135 plus or minus 2° C. A 50–50 mixture of oxygen and nitrogen was fed at the rate of 600 ml. per minute. No initiator was employed and the oxidation mixture was stabilized with 0.1% sodium carbonate. At the end of four hours the product had an acid number of 8–9.

| Properties | Starting Material | Product |
|---|---|---|
| Molecular Weight | 3,600 | 3,700 |
| Softening Point, °C | 102 | 94–101 |
| Hardness | 0.5–5.5 | 0.0–3.0 |
| Acid Number | 0.0 | 8.9 |
| Emulsifiability, percent | None | [1] 100 |

[1] Self-polishing.

Example 8

One-thousand grams of resin grade polyethylene (molecular weight 22,000) was charged to the apparatus used in Example 1. The resin grade polyethylene was degraded by heating for four hours at 360–370° C. in the presence of nitrogen. The molecular weight of the degraded product was 3,200 as determined by iodine number. Thermally degraded polyethylene has one double bond per molecule.

The thermally degraded polyethylene was cooled to 135° C. and 0.1% sodium carbonate added. Air was then started in through the dispersion disc at the rate of 3000 ml. per minute and the oxidation was carried out over a period of 9 hours. The molten wax was poured in molds and allowed to cool and harden.

| Properties | Starting material | DPE | Product |
|---|---|---|---|
| Molecular Weight | 22,000 | 3,200 | 3,150 |
| Softening Point, °C | 117 | 98 | 94–97 |
| Hardness | 0.0 | 1.0–4.5 | 0.0–2.5 |
| Acid Number | 0.0 | 0.0 | 11–12.5 |
| Emulsifiability, percent | None | None | [1] 100 |

[1] Self-polishing.

As shown in Example 8, this invention consists of a 2-step process to produce a new and novel wax-like composition from polyethylene which comprises thermally degrading polyethylene with molecular weights in the range of 10,000–30,000 to molecular weights in the range of 1,000–6,000 in the first step and then oxidizing to an acid number of 4 to 25 with air at 110–150° C. in the second step.

Thermally degraded polyethylene is distinguished from low and high molecular weight polyethylene polymers produced by polymerization in that the material has a relatively narrow molecular weight distribution. One of the most important distinguishing characteristics is the fact that in the process of thermal degradation one double bond per molecule is formed. The combination of a narrow molecular weight range and the presence of a double bond explains the ease of oxidation and the excellent wax properties obtained according to the process of this invention.

The characteristics of the waxes produced by the present invention are illustrated by the above examples. Most of the properties are substantially the same as carnauba wax but in addition this material is substantially tougher and more flexible. In color it is white to light yellow and its appearance is more nearly that of paraffin rather than the darker colors of naturally occurring carnauba. The waxes have specific gravities ranging from 0.90 to 0.97. They will disperse to form a 100% emulsifiable, self-polishing wax and take an extremely high polish. These waxes are not brittle, either at moderate temperatures or at temperatures as low as 0° F., in which respect it is more desirable than carnauba wax for finishing leather and other flexible surfaces. Thus at low temperatures our wax is not subject to minute fracture cracks and loss of surface polish because of flakes or particle scales or chips. Our wax is readily converted to a thixotropic gel by being dissolved in a hydrocarbon and allowed to cool. Its surface is entirely free from tackiness.

One of the outstanding characteristics of natural carnauba wax is its hardness. In a penetrometer at 100° F. and in five seconds with a 200 g. weight carnauba wax gives a reading of 11. Under identical conditions the synthetic wax produced by the oxidation of the thermal degradation products from polyethylene gives readings of 4 or lower.

The Staudinger system of determining molecular weights is intended when reference is made to molecular weights herein. More particularly, the molecular weights of the polymers are calculated from inherent viscosity of a dilute solution of the polymer. The viscosity of a dilute solution of a polyethylene has been shown to be related to be known average molecular weight, $<M_N>$ according to the following formula:

$$(\eta) = 2.21 \times 10^{-3}(<M_N>)0.60$$

The inherent viscosity $(\eta)$, is determined using a 0.25% tetralin solution of the polymer at 100° C.

$$(\eta) = \frac{\ln \eta_r}{C} \quad \eta_r = \frac{\text{flow time of solution}}{\text{flow time of solvent}}$$

The concentration in grams per 100 ml. is denoted by C.

We claim:

1. A process for the preparation of a substantially completely emulsifiable synthetic wax which comprises thermally degrading polyethylene having a molecular weight within the range of 10,000 to 30,000 to obtain a non-emulsifiable product having a molecular weight within the range of 1,000 to 6,000 and a softening point within the range of 90 to 110° C., melting thus-degraded polyethylene and oxidizing molten degraded polyethylene with an oxygen-containing gas at a temperature within the range of 100 to 250° C. to produce a substantially non-crosslinked completely emulsifiable wax having an acid number of from 4 to 25 and having a molecular weight and a softening point not substantially above said non-emulsifiable product.

2. A process for the preparation of a substantially completely emulsifiable synthetic wax which comprises thermally degrading polyethylene having a molecular weight within the range of 10,000 to 30,000 to obtain a non-emulsifiable product having a molecular weight within the range of 1,000 to 6,000 and a softening point within the range of 90 to 110° C., melting thus-degraded polyethylene and oxidizing molten degraded polyethylene in the absence of an oxidation catalyst with an oxygen-containing gas at a temperature within the range of 100 to 250° C. to produce a substantially non-crosslinked completely emulsifiable wax having an acid number of from 4 to 25 and having a molecular weight and a softening point not substantially above said non-emulsifiable product.

3. A process for the preparation of a substantially completely emulsifiable synthetic wax which comprises thermally degrading polyethylene having a molecular weight within the range of 10,000 to 30,000 to obtain a non-emulsifiable product having a molecular weight within the range of 2,500 to 4,500 and a softening point within the range of 90 to 110° C., melting thus-degraded polyethylene and oxidizing molten degraded polyethylene in the absence of an oxidation catalyst with an oxygen-containing gas at a temperature within the range of 120 to 140° C. to produce a substantially non-crosslinked completely emulsifiable wax having an acid number of from 4 to 25 and having a molecular weight and a softening point not substantially above said non-emulsifiable product.

4. A process according to claim 3 wherein an alkali metal hydroxide stabilizer is present in the degraded polyethylene during the oxidation step.

5. A process according to claim 3 wherein an alkali metal carbonate stabilizer is present in the degraded polyethylene during the oxidation step.

6. A 100% emulsifiable synthetic wax prepared according to the process of claim 1.

References Cited in the file of this patent

UNITED STATES PATENTS

| 2,372,001 | Joyce | Mar. 20, 1945 |
| 2,387,571 | Fikentscher et al. | Oct. 23, 1945 |
| 2,766,214 | Erchak et al. | Oct. 9, 1956 |

FOREIGN PATENTS

| 883,653 | Germany | July 20, 1953 |
| 476,476 | Canada | Aug. 28, 1951 |

OTHER REFERENCES

"Polythene" (Renfrew and Morgan), published by Iliffe and Sons (London), 1931 (pages 265–266 relied on).

"Journal Chemical Society" (London), (Oakes et al.), 1949; pages 2929–2931.